(12) United States Patent
Yan

(10) Patent No.: US 12,512,551 B2
(45) Date of Patent: Dec. 30, 2025

(54) ELECTRONIC DEVICE

(71) Applicant: Honor Device Co., Ltd., Shenzhen (CN)

(72) Inventor: Zizhi Yan, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 180 days.

(21) Appl. No.: 18/577,809

(22) PCT Filed: Apr. 10, 2023

(86) PCT No.: PCT/CN2023/087254
§ 371 (c)(1),
(2) Date: Jan. 9, 2024

(87) PCT Pub. No.: WO2024/087527
PCT Pub. Date: May 2, 2024

(65) Prior Publication Data
US 2025/0096394 A1 Mar. 20, 2025

(30) Foreign Application Priority Data

Oct. 24, 2022 (CN) .......................... 202222809177.9

(51) Int. Cl.
*H01M 50/282* (2021.01)
*G03B 17/02* (2021.01)
*H01M 50/247* (2021.01)
*H01M 50/276* (2021.01)
*H01M 50/278* (2021.01)

(52) U.S. Cl.
CPC .......... *H01M 50/282* (2021.01); *G03B 17/02* (2013.01); *H01M 50/247* (2021.01); *H01M 50/276* (2021.01); *H01M 50/278* (2021.01)

(58) Field of Classification Search
CPC .................................................. H01M 50/282
USPC ........................................................ 174/520
See application file for complete search history.

(56) References Cited

U.S. PATENT DOCUMENTS

2019/0173988 A1   6/2019   Lee et al.

FOREIGN PATENT DOCUMENTS

| CN | 107426367 A | 12/2017 |
| CN | 209787208 U | 12/2019 |
| CN | 110868557 A | 3/2020 |
| CN | 210137346 U | 3/2020 |
| CN | 111131582 A | 5/2020 |

(Continued)

*Primary Examiner* — Stanley Tso
(74) *Attorney, Agent, or Firm* — Slater Matsil, LLP

(57) ABSTRACT

This application discloses an electronic device. A battery cover includes a first cover layer and a second cover layer that are arranged in a stacked manner, and the first cover layer is located on an outer side of the second cover layer, where the first cover layer is made of a polyurethane material, and the second cover layer is made of a glass fiber material. The camera assembly includes a decoration member, the decoration member includes a first decoration portion and a second decoration portion, the first decoration portion is located on an outer side of the battery cover and is adhered to the second cover layer, and the second decoration portion is located on an inner side of the battery cover and is adhered to the second cover layer, where the first decoration portion partially covers the first cover layer.

10 Claims, 6 Drawing Sheets

(56) References Cited

FOREIGN PATENT DOCUMENTS

| | | | |
|---|---|---|---|
| CN | 213879944 | U | 8/2021 |
| CN | 115022493 | * | 12/2021 |
| CN | 215120859 | U | 12/2021 |
| CN | 114157741 | A | 3/2022 |
| CN | 216213901 | U | 4/2022 |
| CN | 114827325 | A | 7/2022 |
| CN | 115022437 | A | 9/2022 |
| CN | 115022493 | A | 9/2022 |
| CN | 217445412 | U | 9/2022 |
| CN | 218958940 | U | 5/2023 |
| WO | 2018205814 | A1 | 11/2018 |
| WO | 2022012168 | A1 | 1/2022 |
| WO | 2022184057 | A1 | 9/2022 |

* cited by examiner

ELECTRONIC DEVICE

CROSS-REFERENCE TO RELATED APPLICATIONS

This application is a national stage of International Application No. PCT/CN2023/087254, filed on Apr. 10, 2023, which claims priority to Chinese Patent Application No. 202222809177.9, filed on Oct. 24, 2022. The disclosures of both of the aforementioned applications are hereby incorporated by reference in their entireties.

TECHNICAL FIELD

This application relates to the field of electronic technologies, and specifically, to an electronic device.

BACKGROUND

In recent years, polyurethane (PU) is favored by a consumer electronics industry due to excellent appearance, good hand feeling, and dirt resistance of the polyurethane. Especially in a mobile phone industry, a PU battery cover (a battery cover made of a polyurethane material) has gradually become an essential of a high-end flagship phone.

However, a traditional assembly manner of the PU battery cover and a decoration member in a camera assembly has poor sealing performance and a high cost. In addition, the PU battery cover is prone to degumming when the camera assembly is subjected to external force, and a risk of failure is high.

SUMMARY

To overcome the foregoing problem in the conventional technologies, a main objective of this application is to provide an electronic device with good sealing performance, a low cost, and a low risk of failure.

To achieve the foregoing objective, the following technical solutions are specifically used in this application.

This application provides an electronic device, including a battery cover and a camera assembly, where a mounting hole is arranged on the battery cover, and the camera assembly is mounted in the mounting hole, where the battery cover includes a first cover layer and a second cover layer that are arranged in a stacked manner, and the first cover layer is located on an outer side of the second cover layer, where the first cover layer is made of a polyurethane material, and the second cover layer is made of a glass fiber material; and the camera assembly includes a decoration member, the decoration member includes a first decoration portion and a second decoration portion, the first decoration portion is located on an outer side of the battery cover and is adhered to the second cover layer, and the second decoration portion is located on an inner side of the battery cover and is adhered to the second cover layer, where the first decoration portion partially covers the first cover layer.

In some embodiments, the second cover layer includes a connecting portion, the connecting portion extends in a circle center direction of the mounting hole, so that the connecting portion protrudes from the first cover layer, an inner surface of the first decoration portion is adhered to an outer surface of the connecting portion, and an outer surface of the second decoration portion is adhered to an inner surface of the connecting portion. In the embodiments, the connecting portion of the second cover layer extends in the circle center direction of the mounting hole, to protrude from the first cover layer, thereby facilitating adhering the inner surface of the first decoration portion to the outer surface of the connecting portion, and adhering the outer surface of the second decoration portion to the inner surface of the connecting portion. In addition, an adhesion area is increased, and adhesion stability is improved.

In some embodiments, the connecting portion and the first cover layer are in a first stepped structure. In the embodiments, the connecting portion and the first cover layer are arranged as the stepped structure, to be specific, the outer surface of the connecting portion and an outer surface of another part of the second cover layer are on the same plane. In this way, a manufacturing process is simple, and materials are reduced.

In some embodiments, the first decoration portion includes a covering surface, a connecting surface, and an adhesive surface, the covering surface is connected with the adhesive surface via the connecting surface, so that the covering surface and the adhesive surface form a second stepped structure, the second stepped structure cooperates with the first stepped structure, the covering surface covers an edge of the first cover layer, and the adhesive surface is adhered to the outer surface of the connecting portion. In the embodiments, the covering surface and the adhesive surface are arranged in the second stepped structure, and the second stepped structure cooperates with the first stepped structure, so that the adhesive surface is closer to the connecting portion compared to the covering surface, in other words, a distance between the adhesive surface and the connecting portion is reduced, and the adhesion between the adhesive surface and the connecting portion is more stable.

In some embodiments, the covering surface is arranged parallel to the adhesive surface, and the connecting surface is arranged as an inclined surface. In the embodiments, the connecting surface is arranged as the inclined surface, thereby avoiding interference between the connecting surface and the edge of the first cover layer, making assembly more convenient, and avoiding mutual wear between the first cover layer and the first decoration portion.

In some embodiments, the connecting portion extends in a direction of the first decoration portion, so that the outer surface of the connecting portion is flush with an outer surface of the first cover layer. In the embodiments, the outer surface of the connecting portion is flush with the outer surface of the first cover layer, so that the battery cover in the electronic device may be directly replaced with a glass battery cover when necessary, thereby reducing a cost.

In some embodiments, the electronic device further includes a first back adhesive layer, and the inner surface of the first decoration portion is adhered to the outer surface of the connecting portion through the first back adhesive layer.

In some embodiments, the electronic device further includes a glue dispensing layer, and the inner surface of the first decoration portion is adhered to the outer surface of the connecting portion through the glue dispensing layer.

In some embodiments, there are first back adhesive layers, where the two first back adhesive layers are arranged at an interval, and the glue dispensing layer is located between the two first back adhesive layers. In the embodiments, there are the two first back adhesive layers, the two first back adhesive layers are arranged at an interval, and the glue dispensing layer is located between the two first back adhesive layers. In this way, the first decoration portion is connected with the connecting portion through a plurality of back adhesive layers and the glue dispensing layer, thereby improving adhesion stability of the decoration member and the connecting portion.

In some embodiments, the electronic device further includes a second back adhesive layer, and the outer surface of the second decoration portion is adhered to the inner surface of the connecting portion through the second back adhesive layer. In the embodiments, the second decoration portion is connected with the connecting portion through the second back adhesive layer, thereby further improving the adhesion stability of the decoration member and the connecting portion.

Compared with the conventional technologies, in the embodiments, the decoration member is divided into the first decoration portion and the second decoration portion. The first decoration portion is located on the outer side of the battery cover and partially covers the edge of the first cover layer, the second decoration portion is located on the inner side of the battery cover, and both the first decoration portion and the second decoration portion are adhered to the second cover layer of the battery cover. Because the second cover layer is made of a glass fiber material and is good in adhesion, connection sealing performance and adhesive waterproof performance of the battery cover and the decoration member are improved. In addition, because the first decoration portion partially covers the edge of the first cover layer, there is no need to use a decoration ring, thereby reducing a cost. In addition, the first decoration portion and the second decoration portion are adhered to the inner surface and the outer surface of the second cover layer respectively. Therefore, the connection between the decoration member and the battery cover is stable, so that the battery cover can be prevented from degumming when the camera assembly is subjected to external force, and a risk of failure is low.

Figure 1:
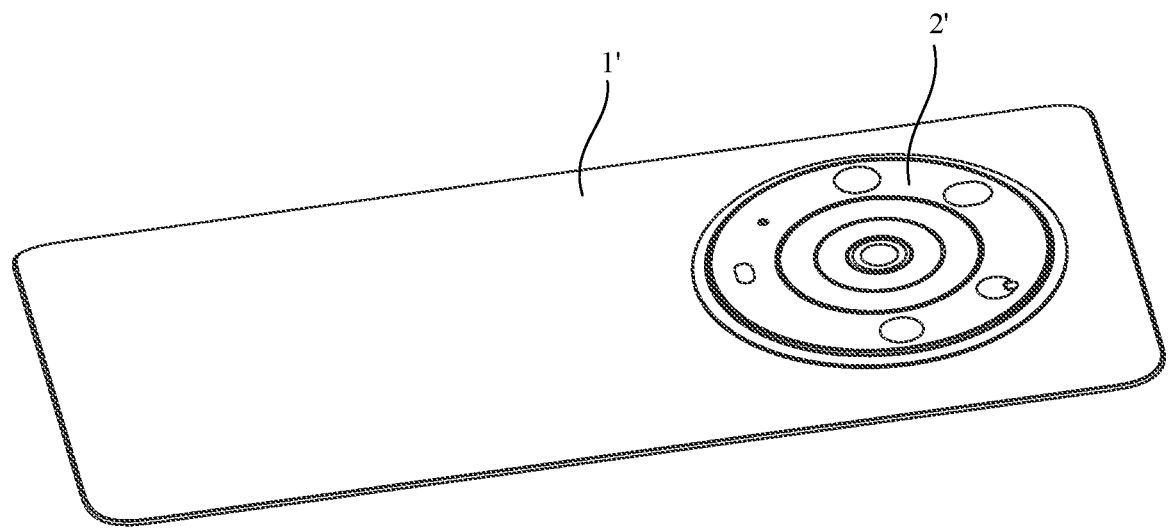
FIG. 1 is a diagram of an assembly structure of a battery cover and a camera assembly of an electronic device in the conventional technologies.
Figure 2:
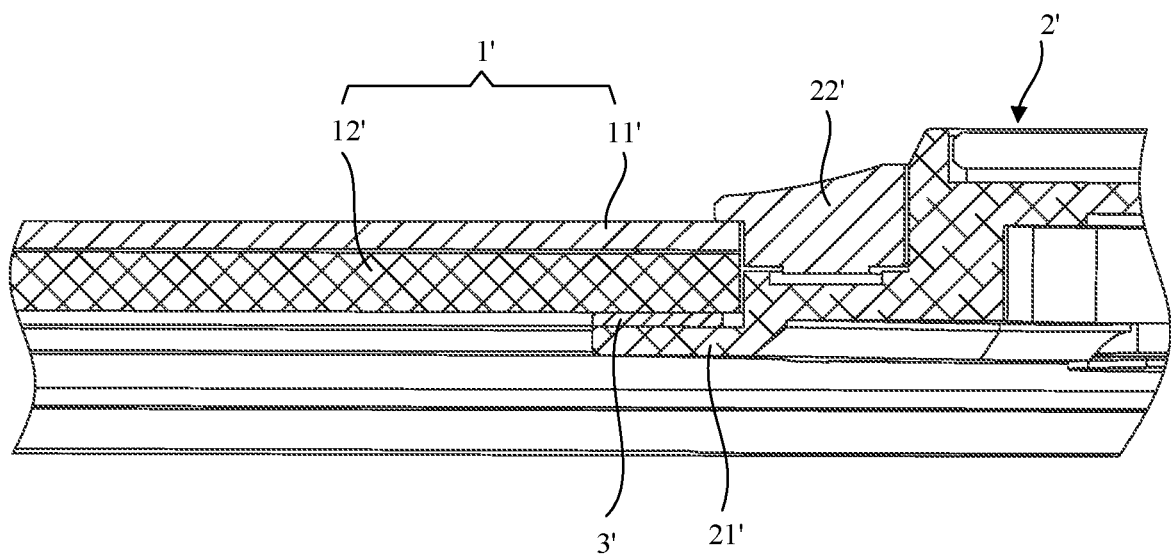
FIG. 2 is an enlarged partial cross-sectional view of the electronic device in FIG. 1.
Figure 3:
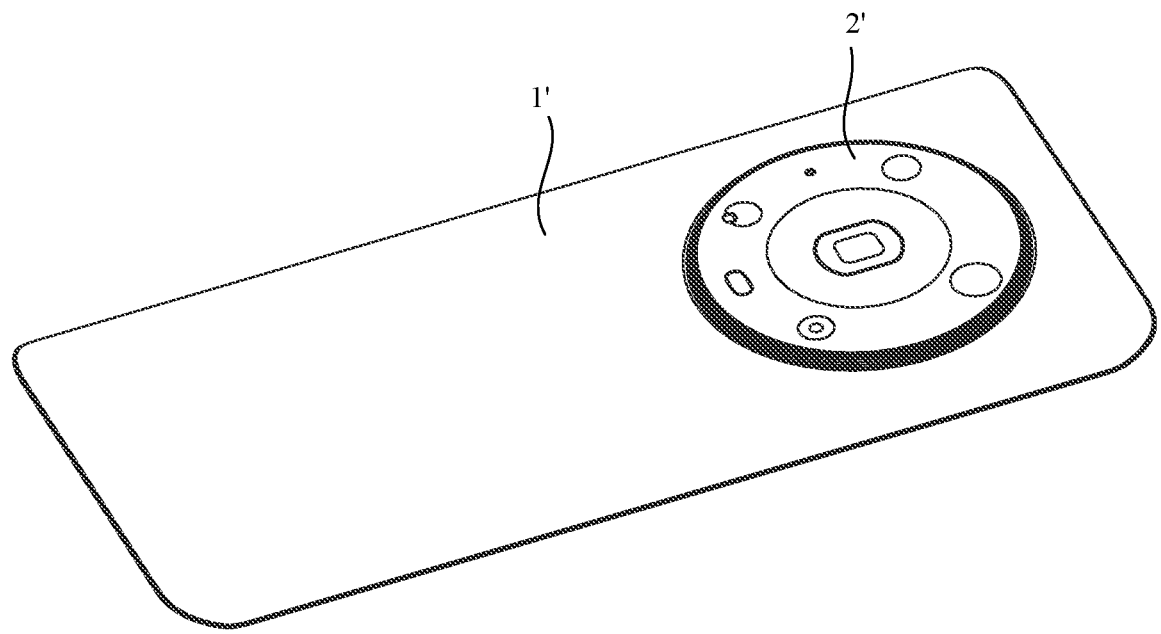
FIG. 3 is a diagram of an assembly structure of a battery cover and a camera assembly of another electronic device in the conventional technologies.
Figure 4:
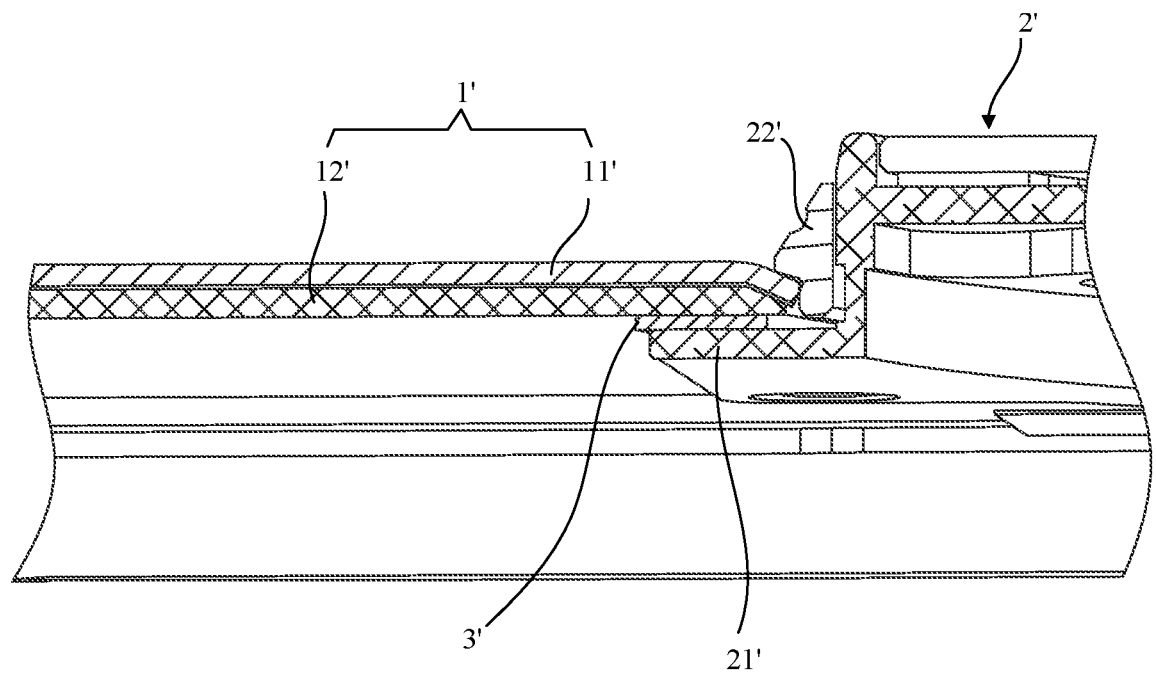
FIG. 4 is an enlarged partial cross-sectional view of the electronic device in FIG. 3.

Identifiers in the accompanying drawings:
1. Battery cover; 11. First cover layer; 12. Second cover layer; 121. Connecting portion; 2. Camera assembly; 21. Decoration member; 211. First decoration portion; 211a. Covering surface; 211b. Connecting surface; 211c. Adhesive surface; 212. Second decoration portion; 3. First back adhesive layer; 4. Glue dispensing layer; 5. Second back adhesive layer; 1'. PU battery cover; 11'. PU layer; 12'. Glass fiber layer; 2'. Camera assembly; 21'. Decoration member; 22'. Decoration ring; 3'. Back adhesive; 1". Glass battery cover; 2". Camera assembly; 21". First decoration portion; and 22". Second decoration portion.

DETAILED DESCRIPTION OF ILLUSTRATIVE EMBODIMENTS

To make the object, technical solutions, and advantages of this application clear, the following further describes this application in detail with reference to the accompanying drawings and embodiments. It should be understood that the specific embodiments described herein are merely used to explain this application, but are not intended to limit this application.

In the descriptions of this application, the terms "first", "second" are merely used for descriptive objectives and are not to be understood as indicating or implying relative importance unless otherwise explicitly specified or limited; the term "a plurality of" means two or more unless otherwise specified or indicated; the term "connection", "fixed", and the like are to be understood broadly. For example, the "connection" may be a fixed connection, a detachable connection, an integral connection, or an electrical connection; it may be a direct connection, or an indirect connection through an intermediate medium. A person of ordinary skill in the art may understand the specific meanings of the foregoing terms in this application as the case may be.

In the description of this application, it should be understood that the position words such as "on", "under" described in embodiments of this application are described from the perspective shown in the accompanying drawings, and should not be understood as limiting the embodiments of this application. In addition, in the context, it should also be understood that when an element is referred to as being "on" or "under" another element, it can be directly connected "on" or "under" the another element, or be indirectly connected "on" or "under" the another element through an intermediate element.

An electronic device, such as a mobile phone, or a tablet computer, usually includes a battery cover, a screen, a battery, a circuit board, a camera assembly, and the like. The battery cover is connected with the screen to form an accommodation cavity. The battery and the circuit board are mounted in the accommodation cavity. In this way, the battery provides electrical energy for the entire electronic device, the circuit board controls work of the entire electronic device, and the screen displays relevant information. In addition, a mounting hole is arranged on the battery cover, and the camera assembly is mounted in the mounting hole of the battery cover. In this way, the electronic device may perform a shooting function through the camera assembly.

Polyurethane (PU) is favored by a consumer electronics industry due to excellent appearance, good hand feeling, and dirt resistance of the polyurethane. Especially in a mobile phone industry, a PU battery cover (a battery cover made of a polyurethane material) has gradually become an essential of a high-end flagship phone. Referring to FIG. 1 to FIG. 4, a traditional assembly manner of a PU battery cover 1' and a camera assembly 2' is as follows. After a PU layer 11' in the PU battery cover 1' is hot-pressed and attached with a glass fiber layer 12', a mounting hole for mounting the camera assembly 2' are arranged at a proper position as required, and an edge of the PU layer 11' and an edge of the glass fiber layer 12' are flush at the mounting hole. The camera assembly 2' is mounted in the mounting hole, so that a skirt edge of a decoration member 21' in the camera assembly 2' is adhered to an inner side of the glass fiber layer 12' through a back adhesive 3'. However, because the PU layer 11' has burrs on the edge thereof and is easy to peel off from the glass fiber layer 12', an additional decoration ring 22' is required to be added around the decoration member 21' to press and block the edge of the PU layer 11' through the decoration ring 22'. However, the foregoing assembly manner has the following problems. (1) The decoration member 21' and an inner side of the PU battery cover 1' are waterproof through a back adhesive, resulting in poor sealing performance. (2) Degumming easily occurs when the decoration member 21' is subjected to external force, resulting in a high risk of failure. (3) The additional decoration ring 22' is required to be added to block the edge of the PU layer 11', increasing a cost.

Figure 5:
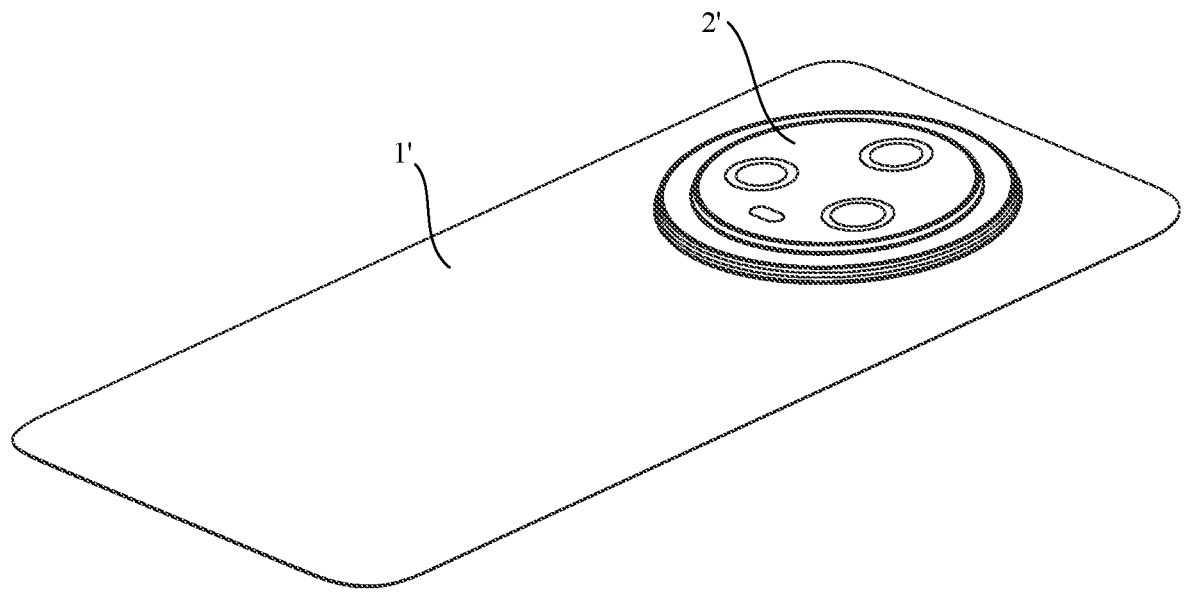
FIG. 5 is a diagram of an assembly structure of a battery cover and a camera assembly of another electronic device in the conventional technologies.
Figure 6:
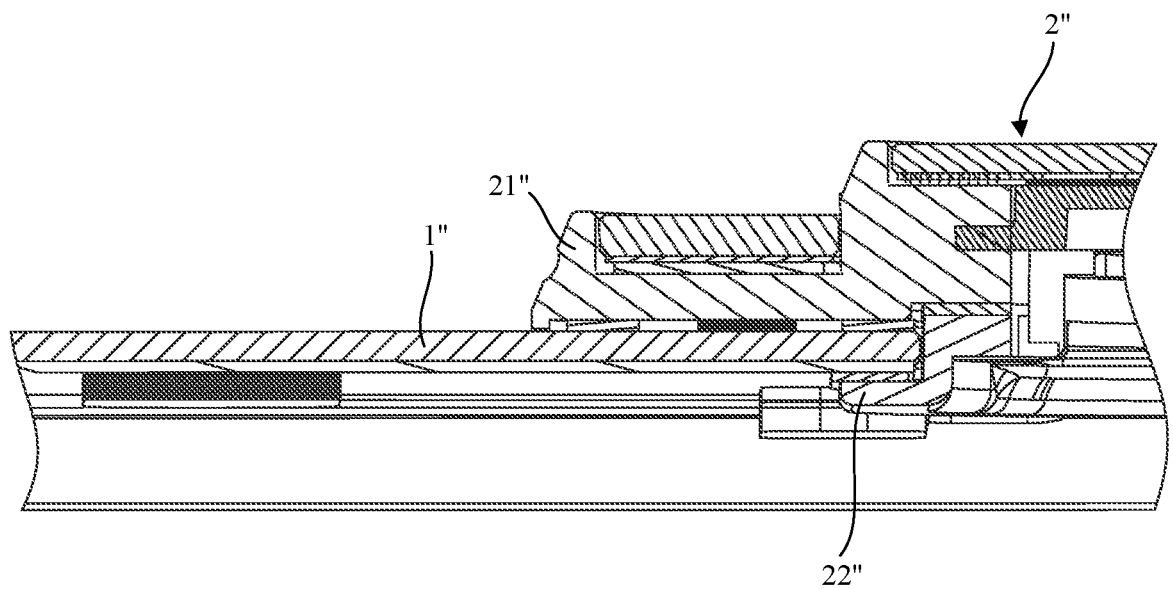
FIG. 6 is an enlarged partial cross-sectional view of the electronic device in FIG. 5.

Referring to FIGS. 5 to 6, a conventional assembly manner of a glass battery cover 1" and a camera assembly 2" is as follows. By using a disassembly manner, a decoration member is divided into two parts: a first decoration portion 21" and a second decoration portion 22", where the second decoration portion 22" is located on an inner side of the glass battery cover 1" and is adhered to an inner surface of the glass battery cover 1", and the first decoration portion 21" is located on an outer side of the glass battery cover 1" and is adhered to an outer surface of the glass battery cover 1", to block an edge of the glass battery cover 1" through the first decoration portion 21". In this way, a decoration ring can be cancelled, thereby reducing a cost and improving sealing performance. However, if the assembly solution is directly applied to a PU battery cover, there is a problem. For example, because PU is a compressible material, has poor adhesive waterproof performance, and cannot be used as an adhesive surface, if the first decoration portion is directly connected with an outer surface of the PU battery cover through adhesion, an IPX8 (waterproof level 8) waterproof rating may not be satisfied.

Figure 7:
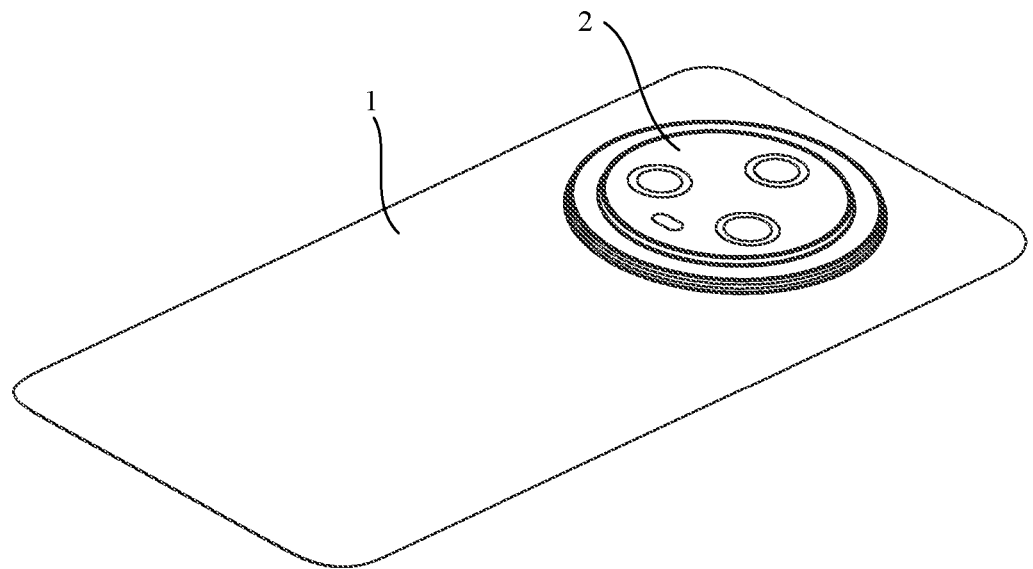
FIG. 7 is a diagram of an assembly structure of a battery cover and a camera assembly of an electronic device according to an embodiment of this application.

Referring to FIG. 7, FIG. 7 is a diagram of an assembly structure of a battery cover and a camera assembly of an electronic device according to an embodiment of this application. This embodiment of this application discloses an electronic device. The electronic device includes a battery cover 1, a camera assembly 2, a battery, a circuit board, and a screen. The battery cover 1 is connected with the screen to form an accommodation cavity, the battery and the circuit board are mounted in the accommodation cavity, and a mounting hole is arranged on the battery cover 1. The camera assembly 2 includes a decoration member and a camera. The decoration member is mounted in the mounting hole, and the camera is mounted on the decoration member. The battery is configured to provide electrical energy for the entire electronic device, the circuit board is configured to control work of the entire electronic device, the screen is configured to display relevant information, and the camera is configured to implement a shooting function of the electronic device.

Figure 8:
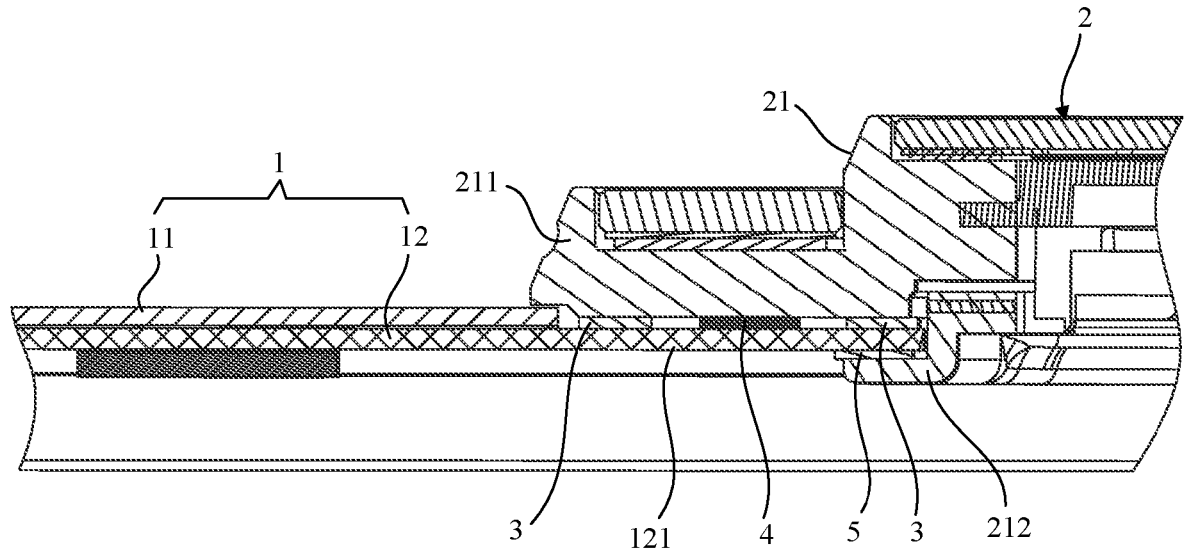
FIG. 8 is an enlarged partial cross-sectional view of the electronic device in FIG. 7.

Referring to FIG. 8, FIG. 8 is an enlarged partial cross-sectional view of the electronic device in FIG. 7. The battery cover 1 includes a first cover layer 11 and a second cover layer 12. The first cover layer 11 and the second cover layer 12 are arranged in a stacked manner, and the first cover layer 11 is located on an outer side of the second cover layer 12. The decoration member 21 includes a first decoration portion 211 and a second decoration portion 212. The first decoration portion 211 is located on an outer side of the battery cover 1 and is adhered to the second cover layer 12, and the first decoration portion 211 partially covers an edge of the first cover layer 11. The second decoration portion 212 is located on an inner side of the battery cover 1 and is adhered to the second cover layer 12. The first cover layer 11 is made of a polyurethane material, and the second cover layer 12 is made of a glass fiber material.

In this embodiment, the decoration member 21 is divided into the first decoration portion 211 and the second decoration portion 212. The first decoration portion 211 is located on the outer side of the battery cover 1 and partially covers the edge of the first cover layer 11, the second decoration portion 212 is located on the inner side of the battery cover 1, and both the first decoration portion 211 and the second decoration portion 212 are adhered to the second cover layer of the battery cover 1. In this way, connection sealing performance and adhesive waterproof performance of the battery cover 1 and the decoration member 21 are improved. In addition, there is no need to use a decoration ring, thereby reducing a cost. In addition, the battery cover 1 can be prevented from degumming when the camera assembly 2 is subjected to external force, and a risk of failure is low.

Figure 9:
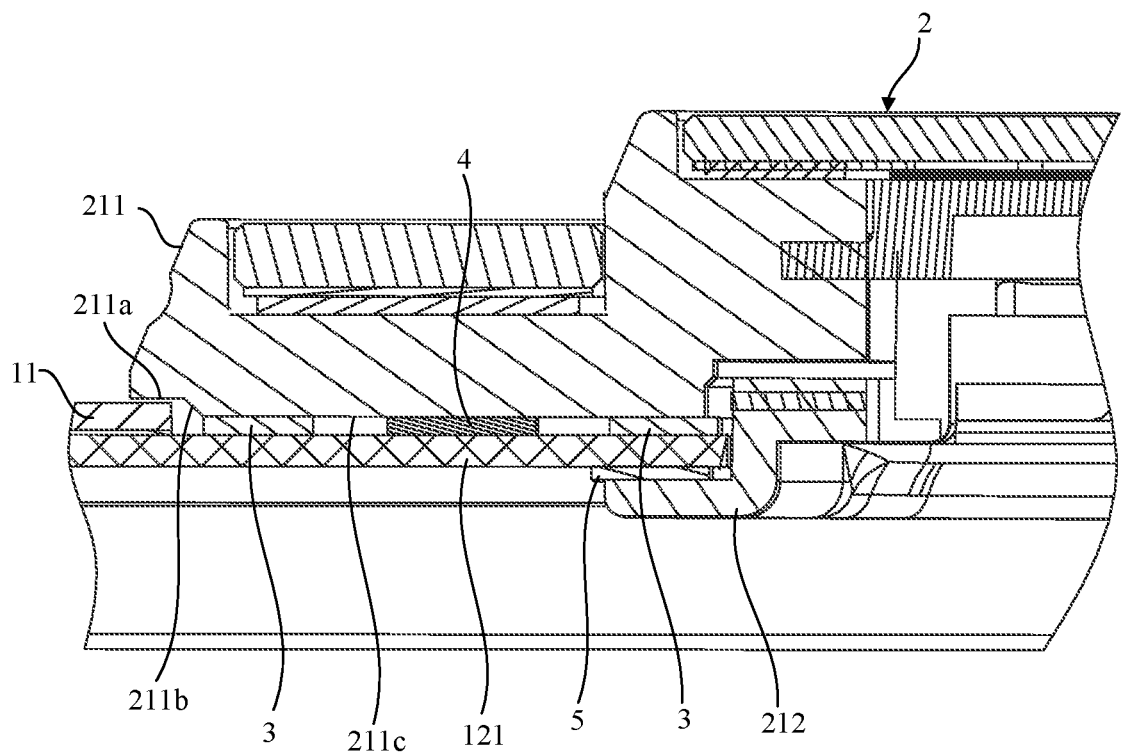
FIG. 9 is another enlarged partial cross-sectional view of the electronic device in FIG. 7.

Referring to FIG. 9, FIG. 9 is another enlarged partial cross-sectional view of the electronic device in FIG. 7. The second cover layer 12 includes a stacked portion and a connecting portion 121, and the connecting portion 121 and the stacked portion are integrally formed. The stacked portion is hot-pressed and attached with an inner side of the first cover layer 11, and the connecting portion 121 extends in a circle center direction of the mounting hole, so that the connecting portion 121 protrudes from the first cover layer 11. The first decoration portion 211 is located on an outer side of the connecting portion 121 and partially covers the edge of the first cover layer 11, and an inner surface of the first decoration portion 211 is connected with an outer surface of the connecting portion 121 through adhesion. The second decoration portion 212 is located on an inner side of the connecting portion 121, and an outer surface of the second decoration portion 212 is connected with an inner surface of the connecting portion 121 through adhesion.

Specifically, the electronic device further includes a first back adhesive layer 3, a glue dispensing layer 4, and a second back adhesive layer 5. There are two first back adhesive layers 3, the two first back adhesive layers 3 are arranged on the connecting portion 121 at an interval, and the glue dispensing layer 4 is arranged on the connecting portion 121 and is located between the two first back adhesive layers 3. In this way, the inner surface of the first decoration portion 211 is adhered to the outer surface of the connecting portion 121 through a plurality of the first back adhesive layers 3 and the glue dispensing layer 4. The outer surface of the second decoration portion 212 is adhered to the inner surface of the connecting portion 121 through the second back adhesive layer 5. In this embodiment, there are the two first back adhesive layers 3, the two first back adhesive layers 3 are arranged at an interval, and the glue dispensing layer 4 is arranged between the two first back adhesive layers 3. In this way, the first decoration portion 211 is connected with the connecting portion through a plurality of back adhesive layers and the glue dispensing layer, thereby improving adhesion stability of the decoration member and the connecting portion.

In this embodiment, the outer surface of the connecting portion 121 and the outer surface of the first cover layer 11 are arranged in parallel and are not on a same plane, so that the connecting portion 121 and the first cover layer 11 are in a first stepped structure. The first decoration portion 211 includes a covering surface 211a, a connecting surface 211b, and an adhesive surface 211c. The covering surface 211a is connected with the adhesive surface 211c via the connecting surface 211b, the covering surface 211a and the adhesive surface 211c are arranged in parallel and are not on a same plane, and the connecting surface 211b is arranged as an inclined surface, so that the covering surface 211a and the adhesive surface 211c form a second stepped structure. The second stepped structure cooperates with the first stepped structure, to be specific, the covering surface 211a covers the edge of the first cover layer 11, and the adhesive surface 211c extends in a direction of the connecting portion 121, in other words, a distance between the adhesive surface and the outer surface of the connecting portion 121 is reduced, and the adhesive surface is connected with the outer surface of the connecting portion 121 through adhesion. In this embodiment, the covering surface 211a and the adhesive surface 211c are arranged in the second stepped structure, and the second stepped structure cooperates with the first stepped structure, so that the adhesive surface 211c is closer to the connecting portion 121 compared to the covering surface 211a, in other words, the distance between the adhesive surface 211c and the connecting portion 121 is reduced, and the adhesion between the adhesive surface 211c and the connecting portion 121 is more stable. In addition, the connecting surface 211b is arranged as the inclined surface, thereby avoiding interference between the connecting surface 211b and the edge of the first cover layer 11, making assembly more convenient, and avoiding mutual wear between the first cover layer and the first decoration portion.

In this embodiment, the first decoration portion 211 and the second decoration portion 212 are located on the inner side and the outer side of the battery cover 1 respectively, the first decoration portion 211 and the second decoration portion 212 are respectively connected with the second cover layer 12 through adhesion, and the first decoration portion 211 partially covers the edge of the first cover layer 11, so that a waterproof effect of the electronic device is improved. In addition, there is no need to use a decoration ring, thereby reducing a cost.

Figure 10:
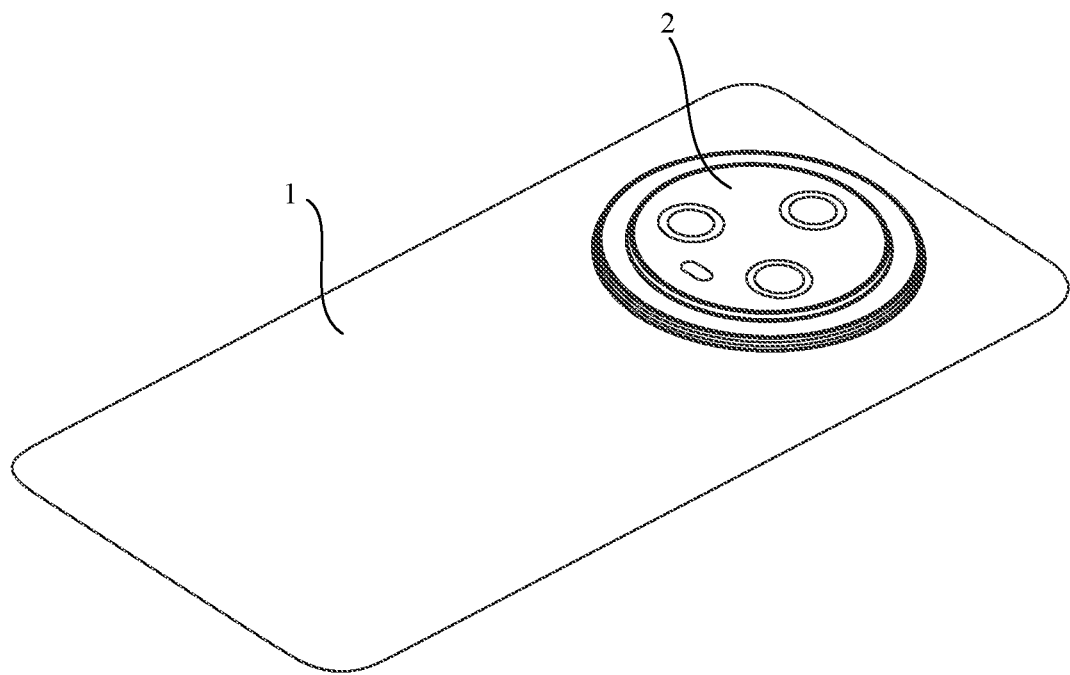
FIG. 10 is a diagram of an assembly structure of a battery cover and a camera assembly of an electronic device according to another embodiment of this application.
Figure 11:
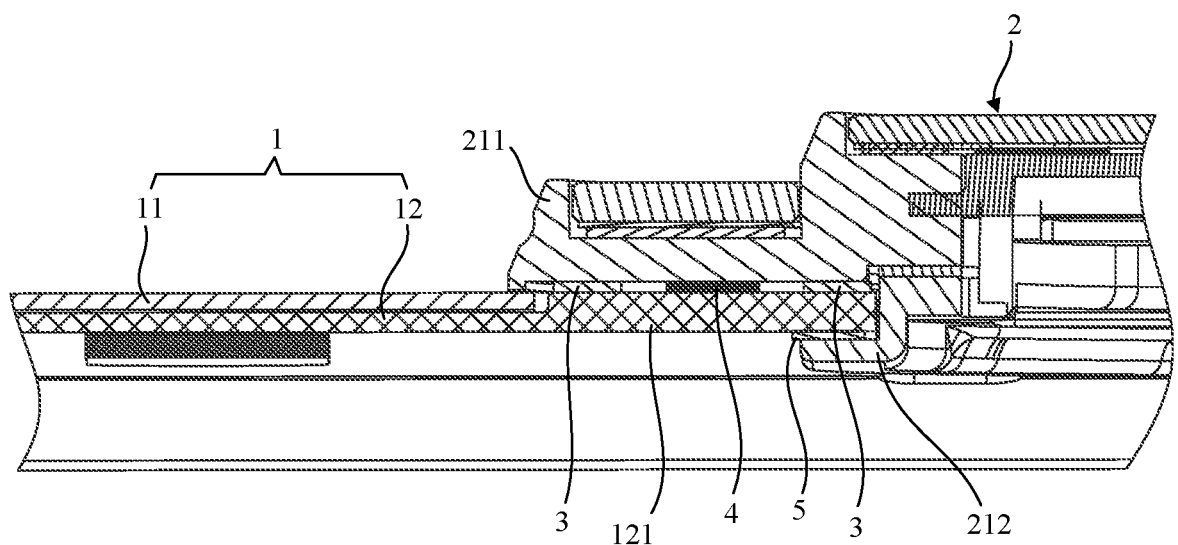
FIG. 11 is an enlarged partial cross-sectional view of the electronic device in FIG. 10.

On the basis of the foregoing embodiments, another specific implementation is further disclosed in the embodiments of this application. The difference between this embodiment and the foregoing embodiments is that, as shown in FIG. 10 and FIG. 11, FIG. 10 is a diagram of an assembly structure of a battery cover and a camera assembly of an electronic device according to another embodiment of this application, and FIG. 11 is an enlarged partial cross-sectional view of the electronic device in FIG. 10. In this embodiment, the connecting portion 121 extends in the circle center direction of the mounting hole, so that the connecting portion 121 protrudes from the first cover layer 11 in a first direction; the connecting portion 121 also extends in the direction of the first decoration portion 211, so that the outer surface of the connecting portion 121 is flush with the outer surface of the first cover layer 11 in a second direction. In this way, the battery cover in the electronic device may be directly replaced with a glass battery cover when necessary, thereby reducing a cost.

In this embodiment, the first decoration portion 211 and the second decoration portion 212 are located on the inner side and the outer side of the battery cover 1 respectively, the first decoration portion 211 and the second decoration portion 212 are respectively connected with the second cover layer 12 through adhesion, and the first decoration portion 211 partially covers the edge of the first cover layer 11, so that a waterproof effect of the electronic device is improved. In addition, there is no need to use a decoration ring, thereby reducing a cost.

The foregoing descriptions are merely preferred specific implementations of this application, but are not intended to limit the protection scope of this application. Any modification or replacement readily conceived by a person skilled in the art within the technical scope disclosed in this application shall fall within the protection scope of this application. Therefore, the protection scope of this application shall be subject to the protection scope of the claims.

What is claimed is:

1. An electronic device, comprising a battery cover and a camera assembly, wherein a mounting hole extends in the battery cover, and the camera assembly is mounted in the mounting hole, wherein
    the battery cover comprises a first cover layer and a second cover layer that are arranged in a stacked manner, and the first cover layer is located on an outer side of the second cover layer, wherein the first cover layer is made of a polyurethane material, and the second cover layer is made of a glass fiber material; and
    the camera assembly comprises a decoration member, the decoration member comprises a first decoration portion and a second decoration portion, the first decoration portion is located on an outer side of the battery cover and is adhered to the second cover layer, and the second decoration portion is located on an inner side of the battery cover and is adhered to the second cover layer, and wherein the first decoration portion partially covers the first cover layer.

2. The electronic device according to claim 1, wherein the second cover layer comprises a connecting portion, the connecting portion extends in a circle center direction of the mounting hole, so that the connecting portion protrudes from the first cover layer, an inner surface of the first decoration portion is adhered to an outer surface of the connecting portion, and an outer surface of the second decoration portion is adhered to an inner surface of the connecting portion.

3. The electronic device according to claim 2, wherein the connecting portion and the first cover layer are in a first stepped structure.

4. The electronic device according to claim 3, wherein the first decoration portion comprises a covering surface, a connecting surface, and an adhesive surface, the covering surface is connected with the adhesive surface via the connecting surface, so that the covering surface and the adhesive surface form a second stepped structure, the second stepped structure cooperates with the first stepped structure, the covering surface covers an edge of the first cover layer, and the adhesive surface is adhered to the outer surface of the connecting portion.

5. The electronic device according to claim 4, wherein the covering surface is arranged parallel to the adhesive surface, and the connecting surface is arranged as an inclined surface.

6. The electronic device according to claim 2, wherein the connecting portion extends in a direction of the first decoration portion, so that the outer surface of the connecting portion is flush with an outer surface of the first cover layer.

7. The electronic device according to claim 2, wherein the electronic device further comprises a first back adhesive layer, and the inner surface of the first decoration portion is adhered to the outer surface of the connecting portion through the first back adhesive layer.

8. The electronic device according to claim 7, wherein the electronic device further comprises a glue dispensing layer, and the inner surface of the first decoration portion is adhered to the outer surface of the connecting portion through the glue dispensing layer.

9. The electronic device according to claim 8, wherein there are two first back adhesive layers, wherein the two first back adhesive layers are arranged at an interval, and the glue dispensing layer is located between the two first back adhesive layers.

10. The electronic device according to claim 2, wherein the electronic device further comprises a second back adhesive layer, and the outer surface of the second decoration portion is adhered to the inner surface of the connecting portion through the second back adhesive layer.

\* \* \* \* \*